United States Patent
Roeder

(10) Patent No.: US 7,623,452 B2
(45) Date of Patent: Nov. 24, 2009

(54) USER CONFIGURABLE FUNCTIONS FOR ADJUSTING SERVICE DIFFERENTIATION METERS

(75) Inventor: Michael T. Roeder, Roseville, CA (US)

(73) Assignee: Hewlett-Packard Development Company, L.P., Houston, TX (US)

(*) Notice: Subject to any disclaimer, the term of this patent is extended or adjusted under 35 U.S.C. 154(b) by 1208 days.

(21) Appl. No.: 10/633,440

(22) Filed: Aug. 1, 2003

(65) Prior Publication Data

US 2005/0025050 A1    Feb. 3, 2005

(51) Int. Cl.
H04J 1/16    (2006.01)

(52) U.S. Cl. .................. 370/230.1; 370/235; 370/252

(58) Field of Classification Search .......... 370/229, 370/230, 230.1, 231, 232, 233, 234, 235
See application file for complete search history.

(56) References Cited

U.S. PATENT DOCUMENTS

| | | | |
|---|---|---|---|
| 6,271,946 B1* | 8/2001 | Chang et al. .................. 398/79 |
| 6,463,068 B1 | 10/2002 | Lin et al. | |
| 6,487,170 B1 | 11/2002 | Chen et al. | |
| 6,539,483 B1 | 3/2003 | Harrison et al. | |
| 6,546,017 B1 | 4/2003 | Khaunte | |
| 6,577,628 B1 | 6/2003 | Hejza | |
| 6,578,083 B2 | 6/2003 | Tuck, III | |
| 6,590,867 B1 | 7/2003 | Ash et al. | |
| 6,594,234 B1 | 7/2003 | Chard et al. | |
| 6,678,474 B1* | 1/2004 | Masuda et al. ................ 398/75 |
| 6,826,149 B1* | 11/2004 | Routliffe .................... 370/230 |
| 6,874,096 B1* | 3/2005 | Norrell et al. ............... 713/400 |
| 6,907,001 B1* | 6/2005 | Nakayama et al. .......... 370/230 |
| 7,035,212 B1* | 4/2006 | Mittal et al. ................. 370/230 |
| 7,239,608 B2* | 7/2007 | Sreejith et al. .............. 370/230 |
| 7,292,534 B2* | 11/2007 | Valvo et al. ................. 370/235 |
| 2002/0036981 A1* | 3/2002 | Park .......................... 370/230 |
| 2002/0049852 A1* | 4/2002 | Lee et al. .................... 709/231 |
| 2004/0037285 A1* | 2/2004 | Viero et al. ................. 370/392 |
| 2004/0057376 A1* | 3/2004 | Sasvari et al. ............... 370/230 |
| 2004/0179473 A1* | 9/2004 | Thibodeau et al. .......... 370/229 |
| 2004/0233845 A1* | 11/2004 | Jeong et al. ................. 370/230 |
| 2005/0105469 A1* | 5/2005 | Hao ............................ 370/235 |
| 2005/0163141 A1* | 7/2005 | Katayama ................... 370/412 |
| 2005/0243745 A1* | 11/2005 | Stanwood et al. ........... 370/280 |

OTHER PUBLICATIONS

J. Heinanen, et al. "A Single Rate Three Color Marker", Request for Comments: 2697, The Internet Society 1999, pp. 1-6.

* cited by examiner

*Primary Examiner*—Ricky Ngo
*Assistant Examiner*—Kan Yuen

(57) ABSTRACT

One embodiment disclosed relates to a method of assigning service priorities to traffic from a plurality of sources using meters. A packet is received and placed into a specific COS group. A fabric-adjusted meter modifier is determined depending on a technology of an uplink being used. The fabric-adjusted meter modifier is then added to a meter corresponding to the specific COS group. Another embodiment disclosed relates to a method of implementing COS functionality in a telecommunications system. A user-configurable function is defined by way of a user interface. The user-configurable function is assigned to be a meter modifier function associated with a class of service in the system.

19 Claims, 8 Drawing Sheets

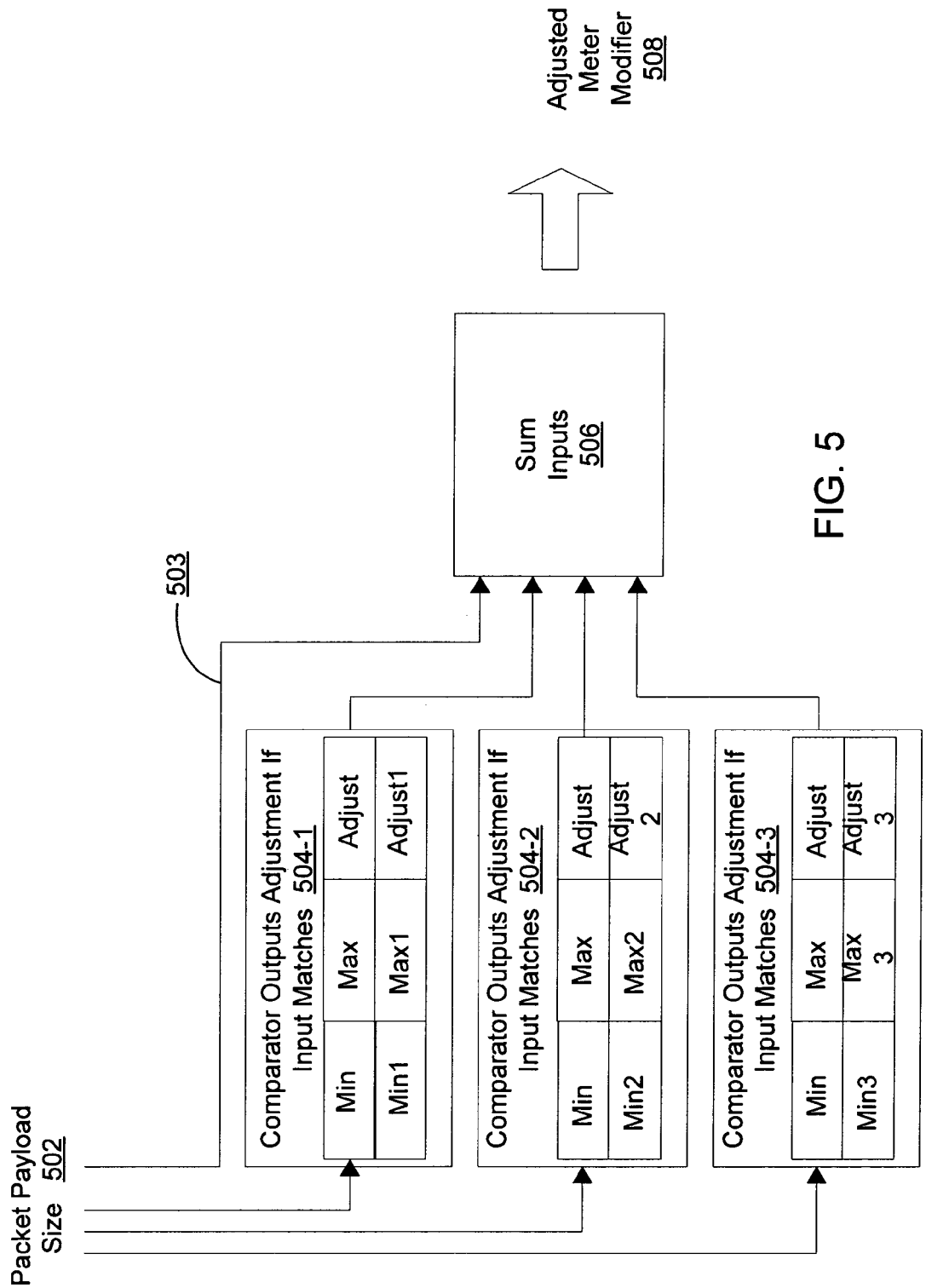

| L2 Fabric | conventional<br>Untagged Ethernet | fabric-adjusted<br>Untagged Ethernet | conventional<br>Tagged Ethernet | fabric-adjusted<br>Tagged Ethernet | conventional<br>Software Router | fabric-adjusted<br>Software Router |
|---|---|---|---|---|---|---|
| Header Size | 12 | 12 | 16 | 16 | 12 | 12 |
| Min Payload Per Frame | 52 | 52 | 52 | 52 | 52 | 52 |
| Max Payload Per Frame | 1544 | 1544 | 1548 | 1548 | 1544 | 1544 |
| COS Meter Function | p | p + 12 | p | p + 16 | p | constant |
| Payload size (p) | Link Utilization % | Link Utilization % | Link Utilization % | Link Utilization % | CPU Utilization % | CPU Utilization % |
| 64 | 100% | 100% | 100% | 100% | 100% | 100% |
| 512 | 75% | 100% | 71% | 100% | 13% | 100% |
| 1024 | 73% | 100% | 69% | 100% | 6% | 100% |

FIG. 6

USER CONFIGURABLE FUNCTIONS FOR ADJUSTING SERVICE DIFFERENTIATION METERS

BACKGROUND OF THE INVENTION

1. Field of the Invention

The present invention relates generally to networking and communications.

2. Description of the Background Art

Class of service (COS) relates to traffic differentiation where packets are treated differently depending on the indicated forwarding class of the packet. For example, a service provider may specify or guarantee a certain service level in the use of an uplink by a customer. The router connecting to the uplink may use a meter to track and control usage of the uplink in relation to the specified service level for a customer. Unfortunately, conventional techniques for using these meters, such as those described in IEEE RFC 2697, result in underutilization of the bandwidth of a link. Meters such as these may be also used in various other networking or communications applications.

It is highly desirable to improve networking and communications systems. In particular, it is desirable to improve the method for assigning packets to COS priority queues and for selecting packets to be dropped.

SUMMARY

One embodiment of the invention relates to a method of assigning service priorities to traffic from a plurality of sources using meters. A packet is received and placed into a specific COS group. A fabric-adjusted meter modifier is determined depending on a technology of an uplink being used. The fabric-adjusted meter modifier is then added to a meter corresponding to the specific COS group.

Another embodiment of the invention pertains to a method of implementing COS functionality in a telecommunications system. A user-configurable function is defined by way of a user interface. The user-configurable function is assigned to be a meter modifier function associated with a class of service in the system.

BRIEF DESCRIPTION OF THE DRAWINGS

FIG. 5 is a diagram depicting use of comparators to implement an adjustment function for a specific technology in accordance with another embodiment of the invention.

FIG. 6 is a table showing improvement in resource utilization in accordance with an embodiment of the invention.

DETAILED DESCRIPTION

As discussed above, prior systems and methods for assigning service priorities to forwarded packets are disadvantageous. The present invention relates to methods and apparatus for assigning service priorities to packets. The service priorities that may be assigned by this invention include (not exclusive) 802.1p priority tags, differential services marking, as well as a service priority that requires the packet to be dropped. Packets that are dropped won't be forwarded.

One embodiment of the invention pertains to a method for assigning service priorities to forwarded traffic. In this embodiment a packet is received and placed into a specific group Ci, this group is associated with a particular class of service. This class of service group, Ci, will have an associated user configurable function, Fj, and a meter, Mi, that is used to measure the amount of bandwidth that is available for forwarding packets in group Ci. The user configurable functions, Fj, can be programmed to generate fabric-adjusted modifiers for the class of service meter. The fabric adjustment functions will generate fabric-adjusted modifiers that take into account not only the payload size of the packet but will actually measure the bandwidth that will be consumed by the packet as it travels through the network. In order to generate the fabric adjusted modifiers for the class of service meters, the fabric-adjustment function may be tailored to the link layer technology of the uplink being used. For every packet P that is received in class Ci, Mi will be set to the sum of Mi and the output of the user configurable adjustment function. Then for every forwarded packet, the Mi value for it's associated group Ci will be compared to threshold values that are specific to group Ci, and the service priority will be selected based upon the smallest threshold that is bigger than Mi. For this embodiment the user specified function uses only the payload size of the input packet as a parameter. However, for other embodiments, the function may take other parameters including, but not limited to, for example, the current value Mi for the group, the amount of time since another packet was received destined for the same destination, or any field from the packet being forwarded. This embodiment represents an improvement over the priority selection mechanism described in RFC 2697.

Figure 1:
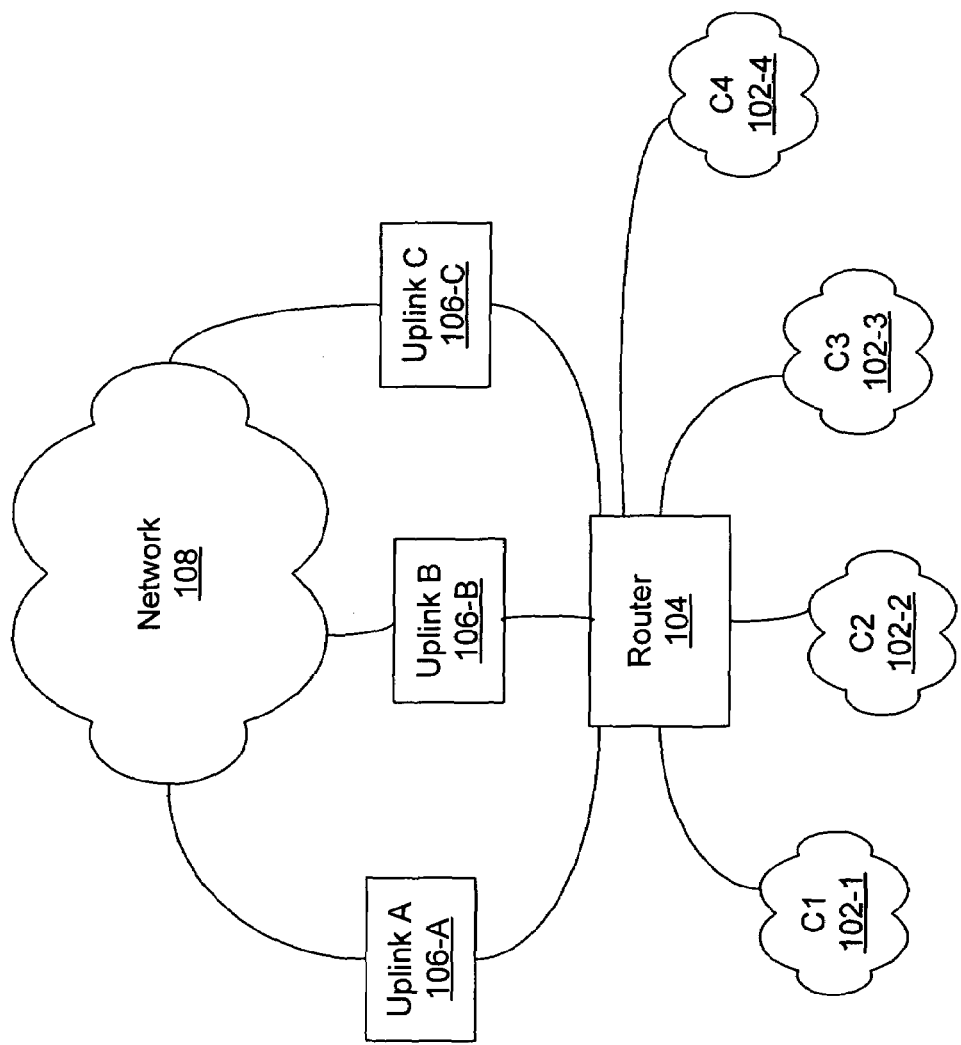
FIG. 1 is a diagram of an example network configuration.

FIG. 1 is a diagram of an example network configuration. The network includes a plurality of customer networks (C1, C2, C3 and C4) 102 coupled to a router 104. The router 104 is configured in this example with multiple uplinks (A, B, and C) 106 to a network 108. In one instance, the network 108 may comprise the Internet. The network shown in FIG. 1 is just one example of a pertinent network configuration.

Figure 2:
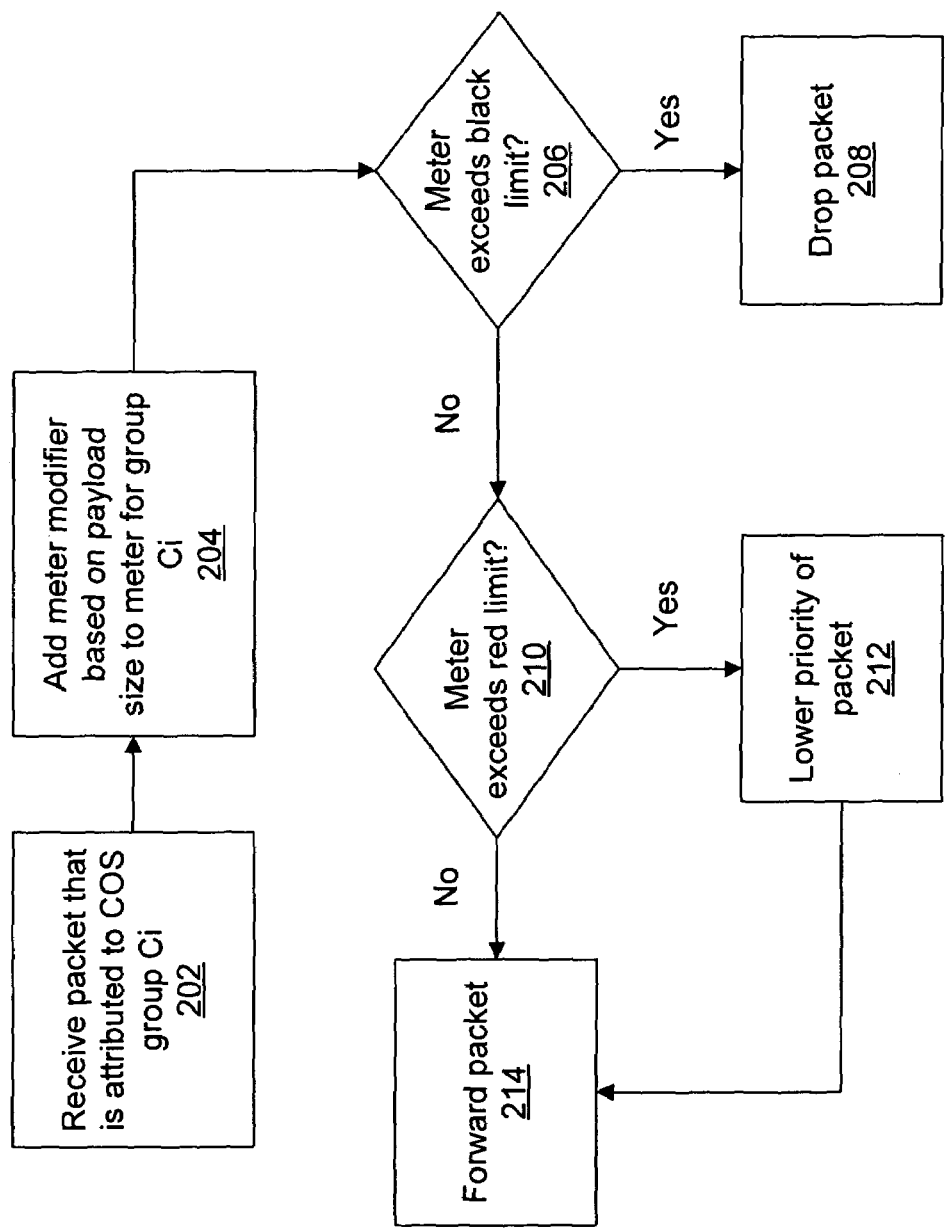
FIG. 2 is a flow chart depicting a conventional method of using COS code points.

FIG. 2 is a flow chart depicting a conventional method of using assigning service priorities to packets. A packet is received and attributed 202 by the router to a specific COS group. The specific COS group may be labeled "Ci" and pertains to a specific service being tracked and controlled. For example, the service may relate to traffic from a particular customer via a specific uplink.

In order to track the service, a meter configured for that purpose will be utilized. The meter may comprise a counter that tracks the traffic associated with the service over a particular period of time. When a packet attributed to group Ci is received, a meter modifier based on a payload size of the packet is added 204 to the corresponding meter. This updates the meter.

Once the meter is updated to reflect the recently received packet, the meter is used to determine how and if to forward the packet. The meter may be compared 206 against a so-called "black" limit. A black limit corresponds to a maximum utilization beyond which packets are to be dropped 208. The meter may also be compared 210 against a so-called "red" limit. A red limit corresponds to a utilization level beyond which the priority level of a packet is reduced 212 before the packet is forwarded 214.

Figure 3:
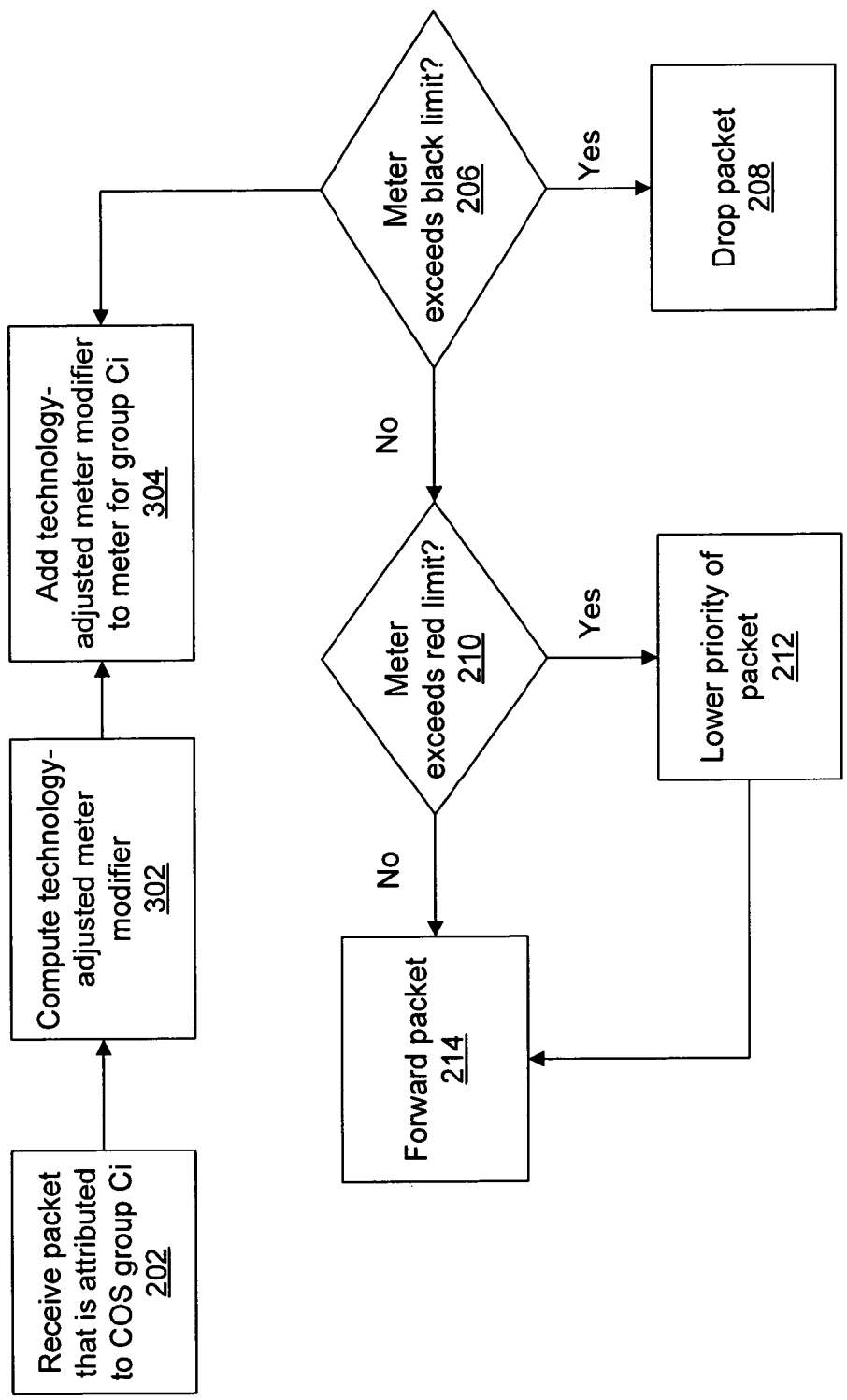
FIG. 3 is a flow chart depicting a method of using COS meters with fabric-adjusted meter modifiers in accordance with an embodiment of the invention.

FIG. 3 is a flow chart depicting a method of using meters with fabric-adjusted meter modifiers in accordance with an embodiment of the invention. The method of FIG. 3 differs from the method of FIG. 2 by two steps 302 and 304. These two steps relate to the computation 302 of a fabric-adjusted meter modifier, and the updating 304 of the meter using this adjusted meter modifier.

Similar to FIG. 2, a packet is received and attributed 202 by the router to a specific COS group. The specific COS group may be labeled "Ci" and pertains to a specific service being tracked and controlled.

Unlike in FIG. 2, a following step involves computation 302 of a fabric-adjusted meter modifier. The fabric-adjusted meter modifier is generated by a user specified function that may be tailored to the specific technology or fabric of an uplink being used. In addition, the fabric-adjusted meter modifier may also depend on the payload size of the packet. For example, the specific link fabric used may comprise tagged or untagged hardware-based routing to an Ethernet link. In another example, the specific link technology used may comprise hardware-based routing to a Synchronous Optical NETwork (SONET) link. In another example, the specific link technology may comprise a form of software-based routing. Other specific link technologies may be used in other examples.

The computation 302 of the fabric-adjusted meter modifier may be performed using various calculation circuits. For example, the calculation circuitry may comprise a look-up table (LUT) that is specified for the particular link technology. Different LUTs would be used for different link technologies. Use of such an LUT is discussed further below in relation to FIG. 4. As another example, the calculation circuitry may comprise a plurality of comparators that are configured for the particular link technology. Different comparator configurations would be used for different link technologies. Use of such comparator circuitry is discussed further below in relation to FIG. 5.

Once the fabric-adjusted meter modifier is calculated, then it is added 304 to the meter corresponding to the COS group. This results in an updated meter value that is a more accurate reflection of the actual bandwidth resources used in forwarding packets for the COS group. The increased accuracy is due to the meter modifier accounting more accurately for the overhead associated with the technology of the limiting link fabric.

Once the meter is updated to reflect the recently received packet, the meter is used to determine how and if the packet should be forwarded. The meter may be compared 206 against a so-called "black" limit. A black limit corresponds to a maximum utilization beyond which packets are to be dropped 208. The meter may also be compared 210 against a so-called "red" limit. A red limit corresponds to a utilization level beyond which the priority level of a packet is reduced 212 before the packet is forwarded 214. Although the black and red limits are discussed above, the invention is not necessarily limited to using the resultant meters in conjunction with these two types of limits. There may be N prioritized limits to compare each with an associated action.

Figure 4:
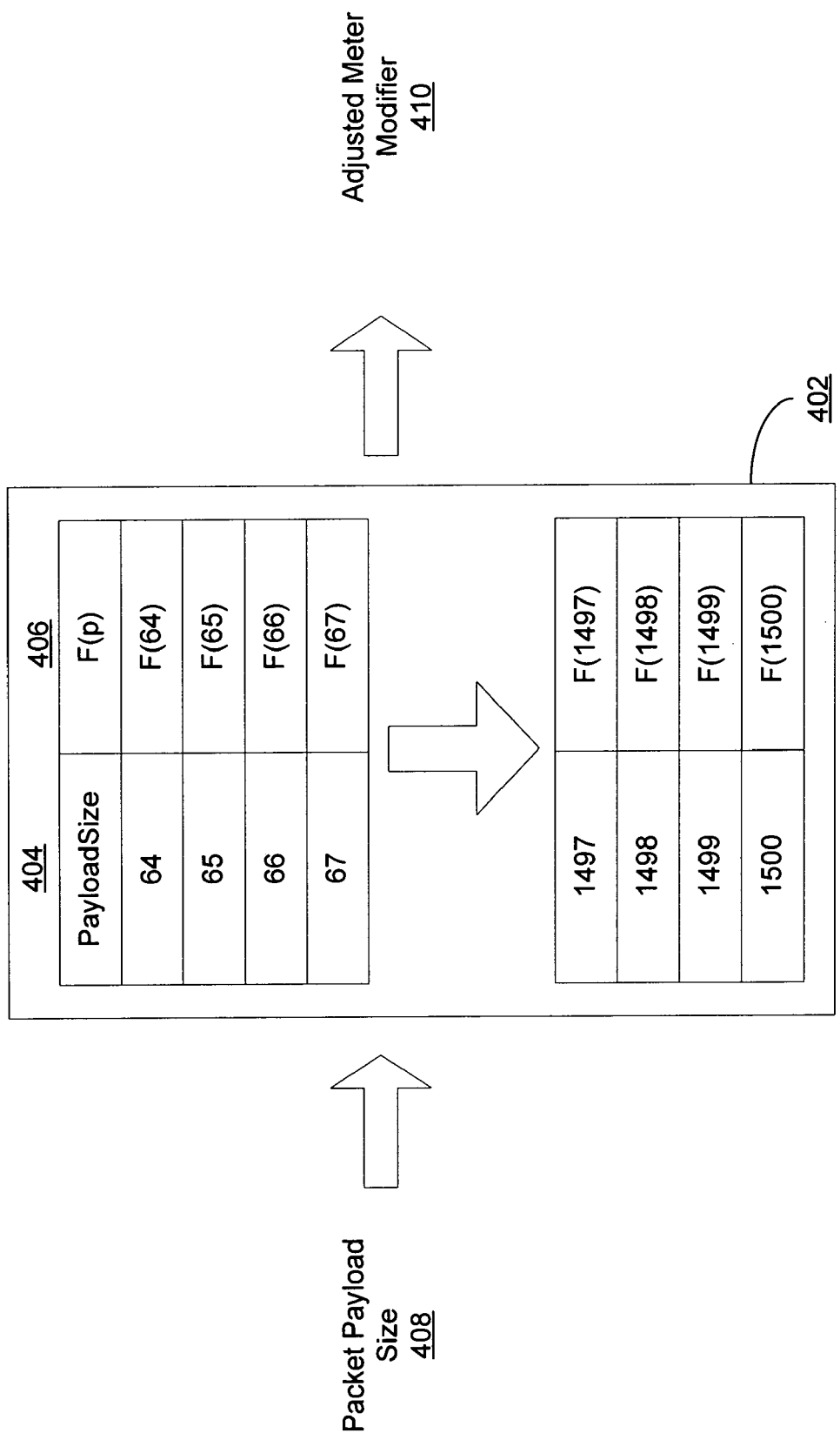
FIG. 4 is a diagram depicting use of a look-up table to implement an adjustment function for a specific technology in accordance with an embodiment of the invention.

FIG. 4 is a diagram depicting use of a look-up table (LUT) to implement an adjustment function in accordance with an embodiment of the invention. The LUT 402 includes a payload size field 404 and adjusted meter modifier function field 406. In this example, the payload size 404 is shown to range from 64 to 1500 bytes (similar to the payload size range for Ethernet), and the adjusted meter modifier function 406 is shown as a function F of the payload size p. A packet payload size 408 is input, and the corresponding adjusted COS meter modifier 410 is output, the output is the value stored at index p of the look up table.

In accordance with an embodiment of the invention, the range of payload sizes and the function F in each LUT 402 is made appropriate for the layer 2 fabric associated with the link being used. The user configurable function F my be configured to take into account the packet overhead (for instance, due to header bytes) in addition to the payload size, as well as any other fabric overheads that may occur as a result of forwarding the packet.

In one embodiment, a hash function could be applied to the payload size p prior to indexing the function lookup table. The hash function could comprise, for instance, the payload size divided by eight (p/8) to reduce the size of the table in memory. Various other hash functions may also be used.

FIG. 5 is a diagram depicting use of comparators to implement an adjustment function for a specific technology in accordance with another embodiment of the invention. A packet payload size 502 is input. The payload size 502 is input directly 503 into an adder 506 and also into a plurality of comparators 504. FIG. 5 shows three such comparators (504-1, 504-2, and 504-3), but an actual implementation may have any number of such comparators.

Each comparator 504 compares the payload size 502 to see if it lies within a range of sizes defined by minimum and maximum values for that comparator 504. If the payload size 502 is within the range specified, then it outputs an adjustment component value. If the payload size 502 is outside the range specified, then a zero value is output. Each comparator may be configured to have a different range and a different function determining its output. The adder 506 provides a summation of the packet payload size 503 plus the outputs of the various comparators 504. The set of comparators may be configured to generate fabric adjusted meter modifiers. In one variation, by setting a configurable flag, the packet payload size 503 that is actually input into the adder 506 may be set to zero.

For example, consider the case where the relevant uplink comprises a SONET fabric. In accordance with that fabric, the overhead increases when the payload size exceeds N bytes or multiples thereof. Hence, the first comparator 504-1 may have Min1=0 bytes and Max1=N bytes. The output of the first comparator 504-1 may be a first constant K1 in bytes. The second comparator 504-2 may have Min1=N+1 bytes and Max1=2N bytes. The output of the second comparator 504-2 may be a second constant K2, where K2 is a number of bytes larger than K1. The third comparator 504-3 may have Min1=2N+1 bytes and Max1=3N bytes. The output of the third comparator 504-3 may be a third constant K3, where K3 is a number of bytes larger than K2. And so on for more comparators as needed. As a result, the fabric-adjusted COS meter modifier 508 comprises a function with a first linear segment for packet sizes from 0 to N bytes, a second linear segment for packet sizes from N+1 to 2N bytes, a third linear segment for packet sizes from 2N+1 to 3N bytes, and so on.

FIG. 6 is a table showing improvement in resource utilization in accordance with an embodiment of the invention. The table includes column pairs, each pair corresponding to a particular OSI layer 2 fabric for a relevant uplink. For example, the fabric may comprise tagged Ethernet, untagged Ethernet, or be software based. Each pair of columns includes a left column relating to the bandwidth utilization that is achievable while guaranteeing a minimum percentage of uplink bandwidth to a set of clients using a conventional fixed function p as the meter adjustment, such as is used in RFC 2697. The right column depicts the percentage of uplink utilization that can be achieved using fabric-adjusted meter adjustment functions that have been configured by the user to adjust for their limiting uplink. A header size, minimum payload per frame, maximum payload per frame, and COS meter function for each column is given.

As shown, the meter adjustment function is equal to the payload size (p) in the conventional cases (no adjustment), while the meter adjustment function using user configurable meter adjustment functions is variable depending on the particular fabric for the fabric-adjusted cases. The fabric-adjusted meter adjustment functions may be, for example, the payload size in bytes plus 12 for untagged Ethernet fabric, the payload size in bytes plus 16 for tagged Ethernet fabric, and a constant number (for example, one) for the software router.

The table also shows the improvement in link utilization attainable in accordance with embodiments of the invention. For untagged and tagged Ethernet, the link utilizations percentages are shown for various payload sizes. In the conventional cases, the link utilization is 100% for payloads of 64 bytes, but the link utilization drops for higher payload sizes. In contrast, the link utilization remains constant at 100% in the fabric-adjusted cases. Similarly, for software routing, the CPU utilization is 100% for payloads of 64 bytes, but the CPU utilization drops for higher payload sizes. In contrast, the CPU utilization remains constant at 100% in the fabric-adjusted cases.

Figure 7:
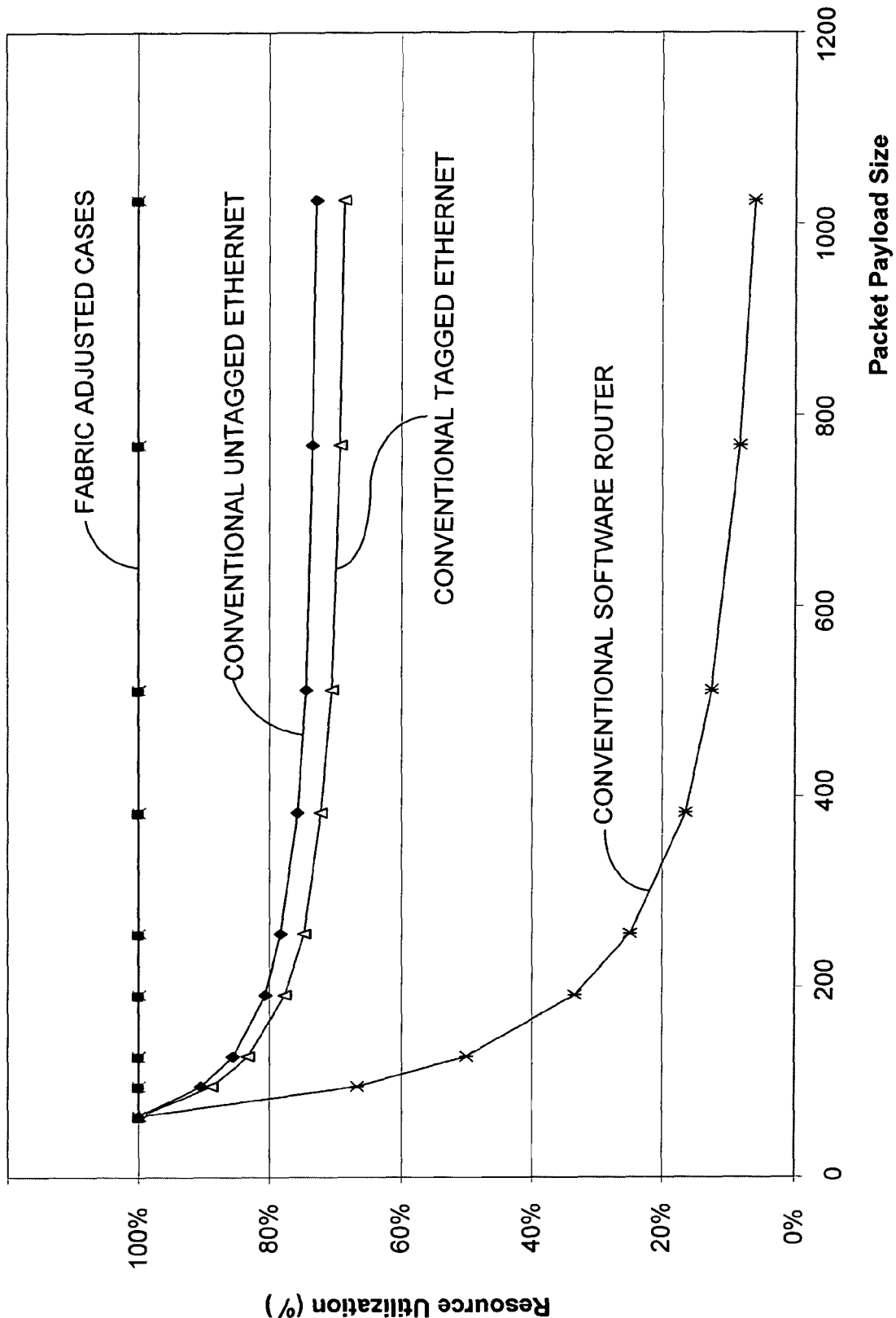
FIG. 7 is a graph showing improvement in resource utilization in accordance with an embodiment of the invention.

FIG. 7 is a graph showing improvement in resource utilization in accordance with an embodiment of the invention. The graph shows that resource utilization for the conventional cases drops below 100% for payload sizes larger than 64 bytes. In contrast, the resource utilization for the fabric-adjusted cases remains constant at 100%.

The above discussion focuses on embodiments relating to fabric-adjusted meter modifiers. Other embodiments of the invention pertain to user-configurable COS meter functions more generally.

Figure 8:
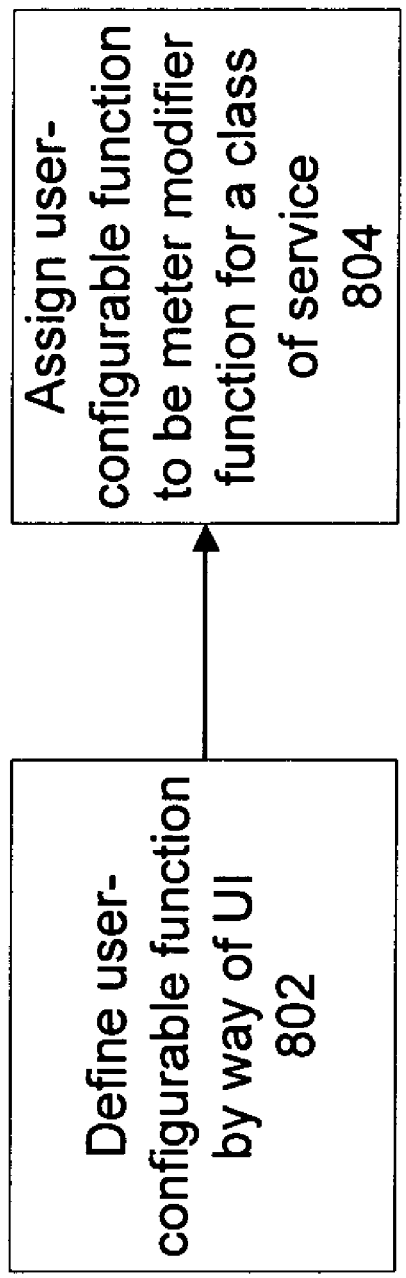
FIG. 8 is a flow chart depicting a method of implementing class of service functionality in a telecommunications system in accordance with an embodiment of the invention.

FIG. 8 is a flow chart depicting a method of implementing class of service functionality in a telecommunications system in accordance with an embodiment of the invention. An administrator of the system defines 802 a user-configurable function by way of a user interface. The system assigns 804 the user-configurable function to be a meter modifier function associated with at least one class of service group in the system. The user-configurable function may depend upon various parameters, for example, a payload size, a current value of the group meter, and/or a last destination of a packet forwarded by the system. The user-configurable function may depend upon other parameters depending on the particular application.

In another embodiment, class of service functionality in a telecommunications system is implemented by defining multiple user-configurable meter modifier functions by way of a user interface. Each service class of a set of service classes is then assigned to one of the user-configurable meter modifier functions.

In the above description, numerous specific details are given to provide a thorough understanding of embodiments of the invention. However, the above description of illustrated embodiments of the invention is not intended to be exhaustive or to limit the invention to the precise forms disclosed. One skilled in the relevant art will recognize that the invention can be practiced without one or more of the specific details, or with other methods, components, etc. In other instances, well-known structures or operations are not shown or described in detail to avoid obscuring aspects of the invention. While specific embodiments of, and examples for, the invention are described herein for illustrative purposes, various equivalent modifications are possible within the scope of the invention, as those skilled in the relevant art will recognize.

These modifications can be made to the invention in light of the above detailed description. The terms used in the following claims should not be construed to limit the invention to the specific embodiments disclosed in the specification and the claims. Rather, the scope of the invention is to be determined by the following claims, which are to be construed in accordance with established doctrines of claim interpretation.

What is claimed is:

1. A method of assigning service priorities to traffic from a plurality of sources using meters, the method comprising:
   receiving a packet that is placed into a specific class of service (COS) group pertaining to a specific service being tracked and controlled;
   determining a fabric-adjusted meter modifier depending on a payload size of the packet and on technology of a limiting uplink being used; and
   adding the fabric-adjusted meter modifier to a meter corresponding to the specific COS group, wherein the meter comprises a counter that tracks traffic associated with said service over a period of time, and wherein said adding updates the meter.

2. The method of claim 1, further comprising:
   determining if the meter exceeds a black-type limit for the specific COS group; and
   if the black-type limit is exceeded, then dropping the packet.

3. The method of claim 1, further comprising:
   determining if the meter exceeds a red-type limit for the specific COS group; and
   if the red-type limit is exceeded, then lowering a priority level of the packet.

4. The method of claim 1, further comprising:
   determining if the COS meter exceeds a limit for the specific COS group and
   if the limit is exceeded then perform an action specified for the limit.

5. The method of claim 1, wherein determining the fabric-adjusted meter modifier comprises retrieving a modifier value associated with the payload size from a technology-specific look-up table.

6. The method of claim 1, wherein the fabric-adjusted meter modifier is different for hardware-based and software-based routing.

7. The method of claim 6, wherein the fabric-adjusted meter modifier is different for tagged and untagged hardware-based routing.

8. The method of claim 6, wherein the fabric-adjusted meter modifier is different for hardware-based routing to an Ethernet link and hardware-based routing to a Synchronous Optical NETwork (SONET) link.

9. The method of claim 1, wherein determining the fabric-adjusted meter modifier comprises summing outputs from a plurality of comparators with the payload size if specified by a user-configurable flag.

10. An apparatus for forwarding traffic from a plurality of sources, the apparatus comprising:
    a port for receiving a packet that is placed into a specific COS group pertaining to a specific service being tracked and controlled;

calculation circuit configured to determine a fabric-adjusted meter modifier depending on a payload size of the packet and on a technology of an uplink being used;

update circuit configured to add the fabric-adjusted meter modifier to a meter corresponding to the specific COS group, wherein said meter comprises a counter that racks traffic associated with said service over a period of time.

11. The apparatus of claim 10, further comprising:

comparison circuitry configured to determine if the meter exceeds a black-type limit for the specific COS group; and non-forwarding circuitry for dropping the packet if the black-type limit is exceeded.

12. The apparatus of claim 10, further comprising:

comparison circuitry configured to determine if the meter exceeds a red-type limit for the specific COS group; and prioritization circuit for lowering a priority level of the packet if the red-type limit is exceeded.

13. The apparatus of claim 10, wherein the calculation circuitry comprises a technology-specific look-up table.

14. The apparatus of claim 10, wherein the calculation circuitry comprises a plurality of comparators and an adder to sum outputs of the comparators.

15. A system for routing traffic from a plurality of sources using class of service (COS) meters, the system comprising:

means for receiving a packet that is placed into a specific COS group pertaining to a specific service being tacked and controlled;

means for determining a fabric-adjusted meter modifier depending on a payload size of the packet and on a technology of an uplink being used;

means for adding the fabric-adjusted meter modifier to a COS meter corresponding to the specific COS group, wherein said meter comprises a counter that tracks traffic associated with said service over a period of time, and wherein said adding updates said meter.

16. A method of implementing class of service (COS) functionality in a telecommunications system, the method comprising:

defining a user-configurable function in said telecommunications system by way of a user interface; and assigning the user-configurable function to be a meter modifier function associated with a class of service group in the system, wherein the meter modifier function depends on a payload size of a packet and is used to adjust for technology of a fabric uplink in said telecommunications system, and adding the meter modifier function to a group meter implemented by a router in said telecommunications system, wherein said adding updates the group meter.

17. The method of claim 16, wherein the user-configurable function depends on a current value of the meter.

18. The method of claim 16, wherein the user-configurable function depends on a last destination of a packet forwarded by the system.

19. A method of implementing class of service (COS) functionality in a telecommunications system, the method comprising:

defining multiple user-configurable meter modifier functions in said telecommunications system by way of a user interface, said meter modifier functions to be added to meters implemented by at least one router in said telecommunications system to update said meters; and assigning each service class of a set of service classes to one of the user-configurable meter modifier functions, wherein the meter modifier functions are dependent upon packet payload size and a type of technology used in an uplink of said telecommunications system.

* * * * *

UNITED STATES PATENT AND TRADEMARK OFFICE
CERTIFICATE OF CORRECTION

PATENT NO.         : 7,623,452 B2                                                        Page 1 of 1
APPLICATION NO.    : 10/633440
DATED              : November 24, 2009
INVENTOR(S)        : Michael T. Roeder It is certified that error appears in the above-identified patent and that said Letters Patent is hereby corrected as shown below:

In column 7, line 1, in Claim 10, delete "circuit" and insert -- circuitry --, therefor.

In column 7, line 4, in Claim 10, delete "circuit" and insert -- circuitry --, therefor.

In column 7, line 6, in Claim 10, delete "racks" and insert -- tracks --, therefor.

In column 7, line 17, in Claim 12, delete "circuit" and insert -- circuitry --, therefor.

In column 7, line 28, in Claim 15, delete "tacked" and insert -- tracked --, therefor.

Signed and Sealed this

Sixth Day of July, 2010

David J. Kappos
*Director of the United States Patent and Trademark Office*